United States Patent
Greiner

(10) Patent No.: US 11,525,903 B2
(45) Date of Patent: Dec. 13, 2022

(54) LIDAR SYSTEM, METHOD FOR OPERATING A LIDAR SYSTEM, AND COMPUTER PROGRAM

(71) Applicant: Robert Bosch GmbH, Stuttgart (DE)

(72) Inventor: Alexander Greiner, Reichenbach (DE)

(73) Assignee: Robert Bosch GmbH, Stuttgart (DE)

( * ) Notice: Subject to any disclaimer, the term of this patent is extended or adjusted under 35 U.S.C. 154(b) by 465 days.

(21) Appl. No.: 16/738,194

(22) Filed: Jan. 9, 2020

(65) Prior Publication Data
US 2020/0217938 A1  Jul. 9, 2020

(30) Foreign Application Priority Data
Jan. 9, 2019  (DE) .......................... 102019200163.7

(51) Int. Cl.
| | | |
|---|---|---|
| G01S 7/48 | (2006.01) | |
| G01S 7/487 | (2006.01) | |
| G01S 17/931 | (2020.01) | |
| G01S 7/4863 | (2020.01) | |

(52) U.S. Cl.
CPC .......... G01S 7/4876 (2013.01); G01S 7/4863 (2013.01); G01S 17/931 (2020.01)

(58) Field of Classification Search
CPC .... G01S 7/4876; G01S 7/4863; G01S 17/931; G01S 7/4816; G01S 7/481; G01S 7/495; G01S 17/88
See application file for complete search history.

(56) References Cited

U.S. PATENT DOCUMENTS

2020/0116831 A1* 4/2020 Spiessberger ......... G01S 7/4816

FOREIGN PATENT DOCUMENTS

DE    102017205685 A1   10/2018

* cited by examiner

*Primary Examiner* — Tony Ko
(74) *Attorney, Agent, or Firm* — Norton Rose Fulbright US LLP; Gerard Messina

(57) ABSTRACT

A lidar system is described for a vehicle for scanning a surrounding area of the vehicle using laser beams, including a transmitting device having a laser beam source which is designed to emit laser beams into the surrounding area of the vehicle, a receiving device having at least one detector for detecting the laser beams reflected in the surrounding area and having at least one first filter that is connectible in front of the detector, wherein
the at least one first filter is designed as an intensity filter for specifically absorbing background radiation. A method for operating a lidar system and a computer program are also described.

15 Claims, 3 Drawing Sheets

LIDAR SYSTEM, METHOD FOR OPERATING A LIDAR SYSTEM, AND COMPUTER PROGRAM

CROSS REFERENCE

The present application claims the benefit under 35 U.S.C. § 119 of German Patent Application No. DE 102019200163.7 filed on Jan. 9, 2019, which is expressly incorporated herein by reference it its entirety.

FIELD

The present invention relates to a lidar system for a vehicle for scanning a surrounding area of the vehicle using laser beams, comprising a transmitting device having a laser beam source, which is designed to emit laser beams into the surrounding area of the vehicle, a receiving device having at least one detector for detecting the laser beams reflected in the surrounding area and having at least one first filter that is connectible in front of the detector.

BACKGROUND INFORMATION

In the coming years, lidar sensors will establish themselves in the implementation of highly automated driving functions. Current lidar systems are made up of a transmitting and receiving device of laser beams. A laser beam source of the transmitting device emits laser radiation into a surroundings. If this light strikes a moving or stationary object, for example a moving or standing vehicle or a pedestrian, it is reflected and cast back in the direction of the receiving device. The light scattered back is collected in a detector of the receiving device. In the process, however, it is not only photons of the laser beam source that are recorded, but also background photons/background light/ambient light. Only a small portion of this can be filtered out by a narrow-band static optical filter in front of the detector. The non-filtered background photons are likewise detected and result in a background noise, which impairs the performance of the lidar system. The photon flux produced by ambient light/background light produces a noise that deteriorates the measuring result. Especially in lidar systems that have a pronounced saturation behavior, this can result in damage, which results in a failure of the lidar system.

German Patent Application No. DE 102017205685 A1 describes a LIDAR device having a dynamic filter and method. The LIDAR device has a dynamic optical filter, which is able to compensate an incidence angle-dependent wavelength shift of an incident beam in that the at least one filter is adaptable to the at least one incident electromagnetic beam.

SUMMARY

It is an object of the present invention to provide a lidar system that has a high availability even in the event of high solar irradiation. This object may be attained by providing a lidar system in accordance with the present invention. The object may also be attained by providing a motor vehicle in accordance with the present invention. Furthermore, the object may be attained by providing a method and a computer program in accordance with the present invention.

Further advantageous features, improvements, and embodiments of the present invention are described herein, which may be combined as desired to achieve further advantages.

According to one aspect of the present invention, a lidar system for a vehicle is provided for scanning a surrounding area of the vehicle using laser beams, comprising a transmitting device having a laser beam source, which is designed to emit laser beams into the surrounding area of the vehicle, a receiving device having at least one detector for detecting the laser beams reflected in the surrounding area and having at least one first filter that is connectible in front of the detector, the at least one first filter being designed as an intensity filter for specifically absorbing background radiation.

In accordance with the present invention, the use of a filter makes it possible to ensure an optimal functioning of a lidar system both in countries having high solar radiation or in midsummer as well as in countries having lower solar irradiation.

According to the present invention, the at least one first filter is designed as an intensity filter for specifically absorbing background radiation. This yields a higher availability of the lidar system even in the event of high solar irradiation and prevents damage to the lidar system by sunlight. This allows for a specific absorption of background light, preferably a regulated absorption. This makes it possible to reduce the quantity of interfering background light. This makes it possible markedly to improve the performance of a lidar system in the event of high extraneous light irradiation.

The design as an intensity filter for specific absorption makes it possible to reduce the quantity of interfering background light and thereby to increase the availability of the lidar system.

The lidar system may comprise multiple transmitting devices and corresponding receiving devices.

The intensity filter is preferably designed as a static intensity filter. The latter may be for example a gray filter or reflection filter. It is thereby possible to ensure the functioning of the lidar system in countries having high solar irradiation.

The intensity filter is preferably designed to be movable to enable the intensity filter to be positioned at least partially in the reflected laser beams in front of the detector. Such a dynamically adapted intensity filter according to the present invention, which is positioned in movable fashion for partial positioning, i.e. for insertion into and removal from the reflected laser beams, results in an improved performance, in particular in an improved accuracy in locating the object and in an improved regulation of the absorption as a function of the background light.

The intensity filter is preferably movable in stepless fashion to enable the intensity filter to be positioned at least partially in stepless fashion in the reflected laser beams in front of the detector. Thus the intensity filter may be inserted into/removed from the reflected laser beams in front of the detector in sliding fashion, i.e. without transition. This makes it possible to position the intensity filter in stepless fashion, which results in an improved capacity/performance of the lidar system.

The intensity filter is preferably movable as a function of an ambient light incident on the intensity filter. A specific improvement of the performance of the lidar system may thereby be achieved.

Preferably an actuator and/or a linear system is provided for moving the intensity filter. Other systems that manage to insert/extract the intensity filter are also possible.

The intensity filter is preferably selectable from a selection unit. Such a dynamically adapted intensity filter according to the present invention, which is selected for example with respect to its properties, results in an improvement of the performance, in particular in an increase of the range of the lidar system as well as in an improved availability. A particularly targeted absorption of background light is possible.

The selection unit preferably comprises a color filter, in particular a black-white filter and/or a neutral density filter, in particular a gray filter and/or a gradient filter, in particular a gradient mask and/or a gray/color gradient filter. It is particularly preferred that the selection of the intensity filter from the selection unit is able to be achieved as a function of the distance of an object detected in the surrounding area.

Laser beams reflected by objects in the close range strike the detector at a different location than those reflected by objects in the far range. In addition, one obtains more signal photons on the detector from close range targets. By selecting the filters it is thus possible to set an ideal signal with respect to the background light as a function of the distance. Thus, for example, it is possible to use the black-white filter in a lidar system having horizontally polarized laser beams and to use the gradient mask in a lidar system having vertically polarized laser beams.

In a preferred development in accordance with the present invention, at least one second filter is provided, the at least one second filter being likewise designed as an intensity filter for the specific absorption of background radiation. The lidar system of the present invention, however, is not limited to two intensity filters, but rather may comprise multiple intensity filters.

The detector is preferably designed as a SPAD (single-photon avalanche diode) detector, which is characterized by a very high amplification of an individual photon for providing a detection signal. Thus a few photons suffice for achieving a signal. The lidar system of the present invention thus makes it possible to position a filter even in SPAD systems, which normally do not allow the attachment of an optical filter. The danger in a SPAD-based lidar system, that the lidar system collects too much background light in the event of strong solar irradiation and is thus no longer functional, is thus eliminated.

Preferably, a rotor having a rotor axle is provided, the rotor being designed to turn the transmitting device and the receiving device about the rotor axle. Preferably, multiple transmitting devices and multiple receiving devices corresponding to the transmitting devices are provided, the rotor being designed to turn the multiple transmitting devices and the multiple receiving devices corresponding to the transmitting devices about the rotor axle. The disposition on the rotor makes it possible to cover different directional and distance information by emitting laser beams at different angles, it being possible subsequently to combine this information into an aggregate information.

According to another aspect of the present invention, a motor vehicle is provided, which is developed having a lidar system as described above. The vehicle is in particular a passenger car or a cargo truck. The lidar system may also be used in other vehicles such as a train for example.

According to another aspect of the present invention, a method is provided for operating a lidar system for a vehicle for scanning a surrounding area of the vehicle using laser beams, including the steps:
  emitting laser beams into the surrounding area using a laser beam source in a transmitting device,
  detecting the laser beams reflected in the surrounding area using a detector in a receiving device,
  providing at least one first filter, the at least one first filter being designed as an intensity filter,
  selective absorption of background radiation by the at least one first filter designed as an intensity filter.

The method of the present invention allows for an improved performance of the lidar system. The method is not limited to a first filter, but rather may comprise multiple filters.

The method preferably includes the following additional step(s): developing the intensity filter as a static intensity filter or moving the intensity filter for at least partially positioning the intensity filter in the reflected laser beams in front of the detector and/or selecting the intensity filter from a selection unit. This allows for an improved adjustment of the lidar system.

The individual measures according to the present invention may be implemented alternatively or in combination in so far as they do not mutually exclude one another.

In a preferred development in accordance with the present invention, the intensity filter is moved as a function of an ambient light incident on the at least one first filter. In another preferred development, the selection of the intensity filter from the selection unit is able to be achieved as a function of the distance of an object detected in the surrounding area.

The method is particularly suited to be implemented in the lidar system according to the present invention.

Another aspect of the present invention is the indication of a computer program, comprising instructions that cause the lidar system as described above to carry out the method as described above.

Further features, properties and advantages of the present invention are derived from the following description with reference to the figures.

DETAILED DESCRIPTION OF EXAMPLE EMBODIMENTS

Although the present invention has been illustrated and described in detail using the preferred exemplary embodiment, the present invention is not restricted by the disclosed examples. One skilled in the art may derive variations of these without leaving the protective scope of the present invention.

Figure 1:
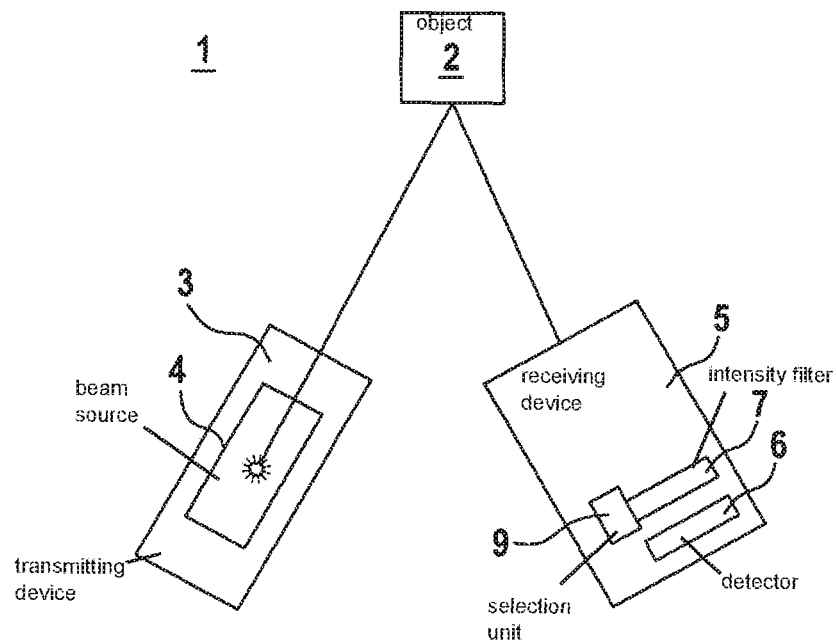
FIG. 1 shows a lidar system according to the present invention in a first embodiment.

FIG. 1 shows a lidar system 1 according to the present invention in a first example embodiment. Lidar system 1 is designed to determine a direction and/or a distance of an object 2. Lidar system 1 is in particular designed to scan a surrounding area of a motor vehicle. Lidar system 1 may be used to determine an orientation of object 2 and a distance of object 2 with respect to the motor vehicle. Objects 2 in this context may be other road users or mobile or immobile traffic objects, for example barrier signs.

Lidar system 1 comprises a transmitting device 3 having a laser beam source 4. Laser beam source 4 may comprise one or multiple lasers. Laser beam source 4 may be designed to be swivelable. Laser beam source 4 emits laser beams for scanning object 2. The laser beams are reflected on object 2. On the basis of the transmission angle at which the laser beams were emitted it is possible to determine the orientation of object 2 with respect to the vehicle; the distance of object 2 may be ascertained on the basis of the run time of the laser beam.

Furthermore, transmitting device 3 may also include other components such as a polarizer for example for polarizing, grating spectrometers etc., which are not shown here.

Lidar system 1 furthermore comprises a receiving device 5 having a detector 6, which may be designed as a photon detector. Detector 6 is in particular designed as a SPAD (single-photon avalanche diode) detector. SPAD detectors achieve a very high amplification of an individual photon for providing a detection signal. Detector 6 converts the power of the laser beams, possibly using downstream amplifiers, into an electrical signal.

An intensity filter 7 is positioned in front of detector 6, which is designed as a movable filter for being at least partially positioned in the reflected laser beams in front of the detector.

Intensity filter 7 is preferably moved as a function of an ambient light incident on intensity filter 7. Intensity filter 7 may be regulated via the evaluation of the background light, which may be determined by receiving device 5. This makes it possible to achieve a specific absorption of background light. In countries having high solar irradiation, it is thus possible to ensure the functioning of lidar system 1 without loss of performance, for example with respect to the range of the object detection.

Additionally or as an alternative to the movable filter described above, intensity filter 7 may be adjustable with respect to various filters/may be selected from various filters.

For this purpose, lidar system 1 has a selection unit 9 for selecting intensity filter 7. Preferably, intensity filter 7 is selected from selection unit 9 as a function of the distance of object 2 from the vehicle. Since reflected light from objects 2, which are located in an area close to the vehicle, strikes detector 6 at a different location than reflected light from objects 2, which are located in an area far from the vehicle, and since more reflected laser beams strike the detector from objects 2 in the close range, an accordingly regulated filter selection is possible, which results in a better absorption of background light.

By selecting the suitable intensity filter 7 in front of detector 6, it is thus possible to perform a specific absorption of background light as a function of the distance and thus to reduce the interfering background light considerably.

Figure 2:
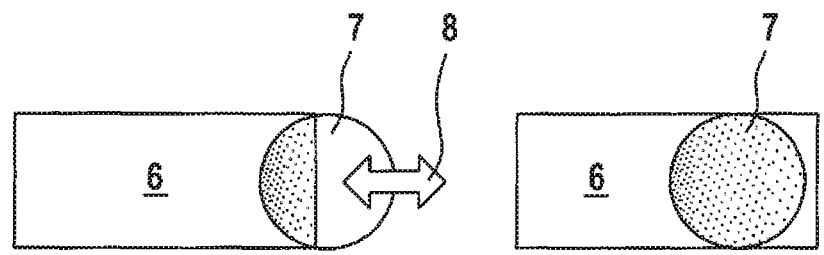
FIG. 2 shows an intensity filter according to the present invention.

Using an arrow 8, FIG. 2 shows schematically the shifting of intensity filter 7 in front of detector 6. This may be achieved for example by an actuator (not shown) or a linear system (not shown). Intensity filter 7 is designed to be movable in stepless fashion for stepless positioning in front of detector 6 until it is completely inserted/removed in front of detector 6. Stepless means in this instance that intensity filter 7 is steplessly adjustable as desired. In FIG. 2, intensity filter 7 is designed as a gradient filter.

It is therefore possible to insert and remove intensity filter 7 steplessly into the area in front of detector 6 as needed.

Figure 3:
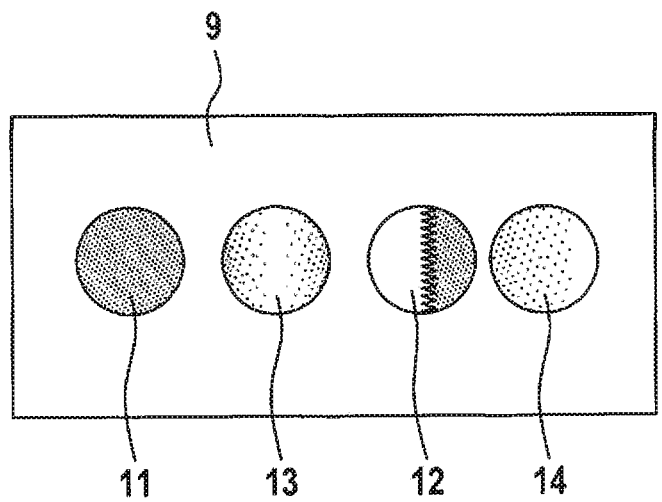
FIG. 3 shows a selection unit including various filters.

FIG. 3 shows a selection unit 9 in detail including various intensity filters. Selection unit 9 comprises, in non-limiting fashion, a neutral density filter, in particular a gray filter 11, a gradient filter, in particular a gradient mask 13 or a gray/color gradient filter 14, and a color filter, in particular a black-white filter 12. With the gradient filters, a continuously variable filter effect is achieved across a filter area. Intensity filter 7 may now be selected from selection unit 9.

For this purpose, preferably, the black-white filter 12 may be used for lidar systems 1 (FIG. 1) having a horizontally polarized light, and the gradient mask 13 may be used for lidar systems 1 (FIG. 1) having vertically polarized light.

Figure 4:
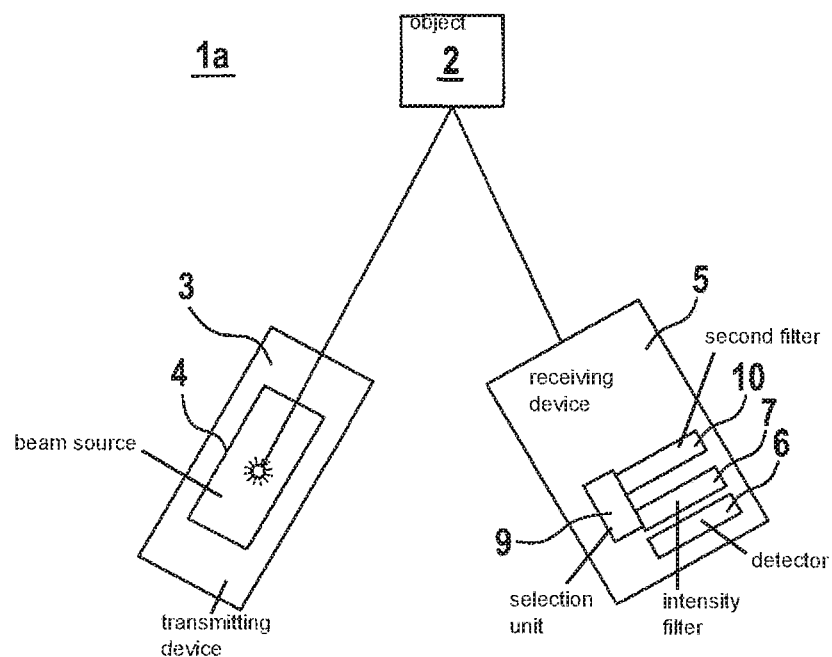
FIG. 4 shows a lidar system according to the present invention in a second embodiment.

FIG. 4 shows a further embodiment of a lidar system 1a. In this instance, a second filter 10 may be disposed in the reflected laser beams in front of detector 6. The second filter may be designed analogous to intensity filter 7.

Figure 5:
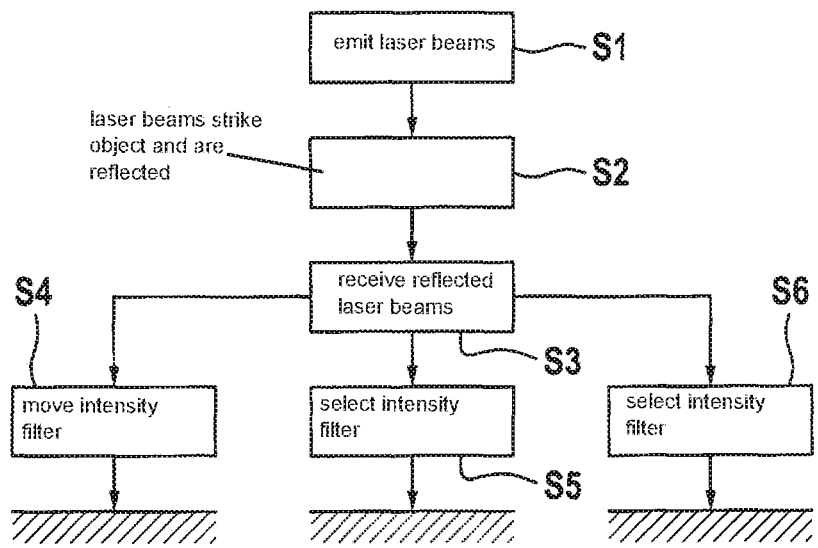
FIG. 5 shows a method according to the present invention.

FIG. 5 shows the method according to the present invention. Here, in a first step S1, laser beam source 4 (FIG. 1) of transmitting device 3 emits laser beams.

In a second step S2, these laser beams strike an object 2 (FIG. 1) and are reflected on the latter. In a third step S3, the reflected laser beams are received by receiving device 5 (FIG. 1).

Subsequently, in a step S4, intensity filter 7 (FIG. 1) is moved as a function of ambient light incident on intensity filter 7 (FIG. 1). Intensity filter 7 (FIG. 1) is inserted in accordance with the ascertained incident ambient light in front of detector 6 (FIG. 1). The ascertainment/calculation of the incident ambient light may be performed in receiving device 5 (FIG. 1).

As an alternative to Step S4, in a step S5, intensity filter 7 (FIG. 1) is selected from selection unit 9 as a function of the distance of the object 2 (FIG. 1) detected in the surrounding area. The calculation of the distance may be performed in receiving device 5 (FIG. 1). Intensity filter 7 (FIG. 1) may be selected from selection unit 9 (FIG. 1) as a function of the calculated distance.

Alternatively, in a step S6, intensity filter 7 (FIG. 1) is selected as a function of the distance of an object 2 (FIG. 1) detected in the surrounding area. In addition, the incident ambient light is calculated/determined in receiving device 5 (FIG. 1). As a function of the ascertained incident ambient light, the selected intensity filter 7 (FIG. 1) is positioned at least partially in front of detector 6 (FIG. 1).

Figure 6:
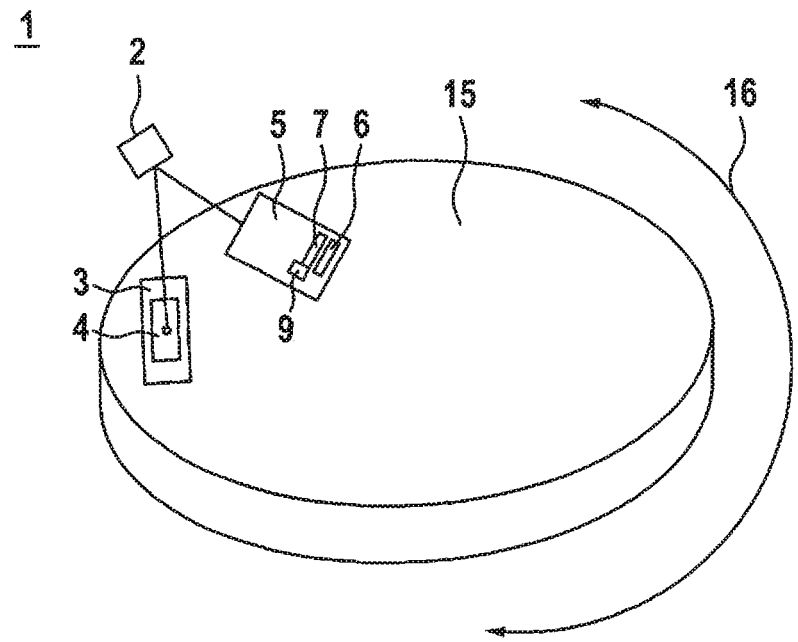
FIG. 6 shows a lidar system according to the present invention including a rotor.

FIG. 6 shows a lidar system 1 according to the present invention including rotor 15. Rotor 15 is supported so as to be rotatable (arrow 16) about a rotor axle (not shown). Rotor 15 may have one or multiple transmitting devices 3 as described above and corresponding receiving devices 5. Rotor 15 is preferably driven by a drive (not shown). Transmitting devices 3 and the corresponding receiving devices 5 rotate as a result. The disposition on the rotor makes it possible to cover different directional and distance information by emitting laser beams at different angles, it being possible subsequently to combine this information into an aggregate information.

The present invention is not restricted to one intensity filter 7. It is also possible to provide two or multiple intensity filters 7 of the present invention. Furthermore, intensity filter 7 may also be designed as a static intensity filter, for example a gray filter or a reflection filter.

What is claimed is:

1. A lidar system for a vehicle for scanning a surrounding area of the vehicle using laser beams, comprising:
    a transmitting device including a laser beam source configured to emit laser beams into the surrounding area of the vehicle;
    a receiving device including at least one detector configured to detect the laser beams reflected in the surrounding area and including at least one first filter that is connectable in front of the detector;
    wherein the at least one first filter is an intensity filter for specifically absorbing background radiation.

2. The lidar system as recited in claim 1, wherein the intensity filter is a static intensity filter.

3. The lidar system as recited in claim 1, wherein the intensity filter is steplessly movable for at least partially positioning the intensity filter in the reflected laser beams in front of the detector.

4. The lidar system as recited in claim 3, wherein the intensity filter is movable as a function of an ambient light incident on the intensity filter.

5. The lidar system as recited in claim 3, further comprising:
an actuator and/or a linear system is provided for moving the intensity filter.

6. The lidar system as recited in claim 1, wherein the intensity filter is selectable from a selection unit.

7. The lidar system as recited in claim 6, wherein the selection unit includes comprises a color filter, and/or a black-white filter, and/or a neutral density filter, and/or a gray filter, and/or a gradient filter, and/or a gradient mask, and/or a gray/color gradient filter.

8. The lidar system as recited in claim 6, wherein the selection of the intensity filter from the selection unit is achievable as a function of a distance of an object detected in the surrounding area.

9. The lidar system as recited in claim 6, wherein the detector is a SPAD detector.

10. The lidar system as recited in claim 1, further comprising:
a rotor having a rotor axle, the rotor being configured to turn the transmitting device and the receiving device about the rotor axle.

11. The lidar system as recited in claim 10, wherein the lidar system includes multiple transmitting devices and multiple receiving devices corresponding to the transmitting devices are provided, the rotor being configured to turn the multiple transmitting devices and the multiple receiving devices corresponding to the transmitting devices about the rotor axle.

12. A motor vehicle, including a lidar system for scanning a surrounding area of the motor vehicle using laser beams, comprising:
a transmitting device including a laser beam source configured to emit laser beams into the surrounding area of the vehicle;
a receiving device including at least one detector configured to detect the laser beams reflected in the surrounding area and including at least one first filter that is connectable in front of the detector;
wherein the at least one first filter is an intensity filter for specifically absorbing background radiation.

13. A method for operating a lidar system for a vehicle for scanning a surrounding area of the vehicle using laser beams, the method comprising:
emitting laser beams into the surrounding area using a laser beam source in a transmitting device;
detecting the laser beams reflected in the surrounding area using a detector in a receiving device;
providing at least one first filter, the at least one first filter being an intensity filter; and
specifically absorbing background radiation by the at least one first filter which is the intensity filter.

14. The method for operating a lidar system as recited in claim 13, wherein: (i) the intensity filter is a static intensity filter, or the intensity filter is moved for at least partially positioning the intensity filter in the reflected laser beams in front of the detector, and/or (ii) the intensity filter is selected from a selection unit.

15. A non-transitory computer-readable storage medium, on which is stored a computer program, which is executable by a processor, comprising:
a program code arrangement having program code for operating a lidar system for a vehicle for scanning a surrounding area of the vehicle using laser beams, by performing the following:
emitting laser beams into the surrounding area using a laser beam source in a transmitting device;
detecting the laser beams reflected in the surrounding area using a detector in a receiving device;
providing at least one first filter, the at least one first filter being an intensity filter; and
specifically absorbing background radiation by the at least one first filter which is the intensity filter.

* * * * *